(12) United States Patent
Kim

(10) Patent No.: US 9,755,407 B2
(45) Date of Patent: Sep. 5, 2017

(54) DRAW OUT APPARATUS FOR AIR CIRCUIT BREAKER

(71) Applicant: LSIS CO., LTD., Anyang-si, Gyeonggi-do (KR)

(72) Inventor: Kyujung Kim, Anyang-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 15/276,610

(22) Filed: Sep. 26, 2016

(65) Prior Publication Data

US 2017/0207609 A1 Jul. 20, 2017

(30) Foreign Application Priority Data

Jan. 15, 2016 (KR) ........................ 10-2016-0005488

(51) Int. Cl.
*H02B 11/133* (2006.01)
(52) U.S. Cl.
CPC ................... *H02B 11/133* (2013.01)
(58) Field of Classification Search
CPC ........ H02B 11/133; H01H 9/20; H01H 33/46; H01H 71/70; H01H 33/36
USPC .......... 361/600, 727, 115, 71; 200/400, 401, 200/244, 238, 318, 320–325, 327, 50.26
See application file for complete search history.

(56) References Cited

U.S. PATENT DOCUMENTS

| | | | | |
|---|---|---|---|---|
| 2,157,863 | A | * | 5/1939 | Ow ........................ H01H 33/36 335/74 |
| 3,559,121 | A | * | 1/1971 | Powell .................... H01H 71/70 200/401 |
| 4,693,132 | A | | 9/1987 | Buxton et al. |
| 5,120,913 | A | * | 6/1992 | Leach .................. H02B 11/127 200/50.26 |
| 6,160,228 | A | | 12/2000 | Gerbert-Gaillard et al. |
| 6,265,678 | B1 | | 7/2001 | Robbins et al. |

FOREIGN PATENT DOCUMENTS

| | | |
|---|---|---|
| CN | 2603496 | 2/2004 |
| CN | 104112611 | 10/2014 |
| CN | 104409294 | 3/2015 |
| EP | 2899817 | 7/2015 |
| FR | 3019242 | 10/2015 |
| JP | H08154315 | 6/1996 |
| KR | 20000013900 | 3/2000 |
| KR | 200378089 | 3/2005 |

(Continued)

OTHER PUBLICATIONS

Search Report dated Apr. 14, 2016 by Korean Institute of Patent Information for KR Application No. 10-2016-0005488, 5 pages.

(Continued)

*Primary Examiner* — Edwin A. Leon
(74) *Attorney, Agent, or Firm* — Lee, Hong, Degerman, Kang & Waimey

(57) ABSTRACT

The present invention relates to a draw out apparatus for an air circuit breaker, and more particularly, to a draw out apparatus for an air circuit breaker capable of allowing a circuit breaker body to be stopped at a preset position, by executing idling when an abnormal operation such as an over-draw in operation and an over-draw out operation occurs at the preset position such as a disconnect position, a test position or a connect position, and capable of preventing damage of a circuit breaker and a cradle.

10 Claims, 15 Drawing Sheets

(56) References Cited

FOREIGN PATENT DOCUMENTS

| KR | 100621115 | 9/2006 |
| KR | 1020090019541 | 2/2009 |
| KR | 100890782 | 3/2009 |

OTHER PUBLICATIONS

Korean Intellectual Property Office Application Serial No. 10-2016-0005488, Office Action dated Apr. 14, 2017, 5 pages.
European Patent Office Application Serial No. 16189448.0, Search Report dated May 12, 2017, 8 pages.

* cited by examiner

DRAW OUT APPARATUS FOR AIR CIRCUIT BREAKER

CROSS-REFERENCE TO RELATED APPLICATION

Pursuant to 35 U.S.C. §119(a), this application claims the benefit of an earlier filing date and right of priority to Korean Patent Application No. 10-2016-0005488, filed on Jan. 15, 2016, the contents of which are all hereby incorporated by reference herein in its entirety.

BACKGROUND OF THE INVENTION

1. Field of the Invention

The present invention relates to a draw out apparatus for an air circuit breaker, and more particularly, to a draw out apparatus for an air circuit breaker capable of allowing a circuit breaker body to be stopped at a preset position, by executing idling when an abnormal operation such as an over-draw in operation and an over-draw out operation occurs at the preset position such as a disconnect position, a test position or a connect position, and capable of preventing damage of a circuit breaker and a cradle.

2. Background of the Invention

Generally, an air circuit breaker, a kind of circuit breaker capable of switching a load on an electric circuit, a power line, a substation line, etc., or capable of interrupting a current when an accident such as a ground fault or a short circuit occurs. The air circuit breaker is mainly used for a low pressure device.

The air circuit breaker may be provided with a cradle, for inspection or replacement of a circuit breaker body. The air circuit breaker may be categorized into a fixed type where a circuit breaker body is fixed to a cradle, and a draw-out type where a circuit breaker body is drawn-in or drawn-out of a cradle. Hereinafter, the draw-out type circuit breaker will be explained.

For current conduction, the circuit breaker body is inserted into the cradle. In such an inserted state, the circuit breaker executes a closing operation (ON) and a trip operation (OFF). In a closed state of the circuit breaker (ON), when an accident current occurs from a line, the circuit breaker interrupts a current after a predetermined time lapses or immediately according to a size of the accident current.

Among apparatuses applied to the air circuit breaker, a draw out apparatus serves to insert a circuit breaker body into a cradle or to draw the circuit breaker body out of the cradle. Generally, the draw out apparatus for the air circuit breaker includes a moving rack having thereon a circuit breaker body and linearly-moveable into a cradle; and a screw shaft (or a lead screw) screw-connected to the moving rack and configured to transfer a rotational driving force provided from a handle to the moving rack after converting the rotational driving force into a linear driving force. Once the handle is connected to the screw shaft to thus be rotated, a rotational driving force is converted into a linear driving force by the screw shaft. Accordingly, the moving rack is linearly moved, and thus the circuit breaker body disposed on the moving rack is inserted into or drawn out of the cradle.

FIG. 1 is a view illustrating an inner structure of an air circuit breaker in accordance with the conventional art. FIG. 2 is a planar view of a draw out apparatus for an air circuit breaker in accordance with the conventional art. And FIG. 3 is a perspective view of a screw shaft and a coupling applied to a draw out apparatus for an air circuit breaker in accordance with the conventional art.

The conventional air circuit breaker 100 includes a circuit breaker body 101 having movable contactors for phases, fixed contactors for phases, and having an insulation partition wall for electrically insulating the movable contactors and the fixed contactors from each other; a cradle 102 configured to accommodate therein the circuit breaker body, and having a terminal part at a rear side thereof, the terminal part to which a power side line and a load side line of an external power system are connected; a switching mechanism 103 configured to provide a driving force to simultaneously open and close the movable contactors (not shown) inside the circuit breaker body 101; and a girder 104 installed at a lower end of a front surface of the cradle 102, and configured to provide a user with an access means for manipulation of the air circuit breaker.

As shown in FIG. 2 or FIG. 3, the conventional draw out apparatus for the air circuit breaker includes a draw out shaft 122, a screw shaft 121, a moving rack 120, a coupling 126, springs 127, 128, a reset operator 124, an indicating rod 123, and a lock plate 129. The coupling 126 and the springs 127, 128 are moveable to a power transmission position where a driving force generated from the handle (H) to draw in or draw out the circuit breaker body is transferable to the moving rack 120, and a power transmission stop position where power transmission is not executable.

When pressed by a user, the reset operator 124 pressurizes the springs 127, 128 such that the springs store an elastic energy therein. As a result, the coupling 126 is disposed at a position where a rotational force of the draw out shaft 122 is transferable to the screw shaft 121. The reset operator 124 includes a fore end part 124b extending by penetrating a supporting member 125 and configured to restrict a downward movement of the reset operator 124, a reset pressing end part 124a, and a protrusion (not shown) at one side thereof. A latch groove 124c, configured to insert a latch part 123b of the indicating rod 123 thereinto for a restricted state or to separate the latch part 123b therefrom for a released state, is provided at the protrusion.

The indicating rod 123 (or an indicator) is provided with the latch part 123b configured to restrict the reset operator 124, or configured to release a restricted state of the reset operator 124 when the circuit breaker body 101 is at a connect position, a test position or a disconnect position. And the indicator rod 123 is provided with a twisted part 123a connected to the moving rack 120, and is rotated as the moving rack 120 is linearly moved to thus indicate a position of the circuit breaker body 101.

A position display part 123c of the indicating rod 123 has arrows displayed on a sectional surface thereof in correspondence to three positions of the circuit breaker body 101, i.e., a connect position, a test position, and an disconnect position. And marks corresponding to the connect position, the test position, and the disconnect position are displayed around a position display part expositing hole 104c of the girder 104.

The lock plate 129 may restrict the coupling 126 by contacting an outer circumferential surface of the coupling 126. And the lock plate 129 temporarily restricts the coupling 126 whenever the indicating rod 123 releases the reset operator 124 on the three positions, thereby temporarily stopping a draw in operation or a draw out operation of the circuit breaker body. More specifically, the lock plate 129, a plate member, is provided with an angular inner circumferential part 129a such that a rotation of the coupling 126 is stopped when an angular outer circumferential part 126b of the coupling 126 is inserted in the angular inner circumferential part 129a. Whenever the latch part 123b of the indicating rod 123 releases the reset operator 124 on three positions of the circuit breaker body 10 (i.e., a connect position, a test position, and an disconnect position), the lock plate 129 downward moves (refer to FIG. 2) by a restoration force of an upper spring 127, i.e., a tensile force of the upper spring 127. As a result, as shown in FIG. 6, as the angular outer circumferential part 126b of the coupling 126 is inserted into the angular inner circumferential part 129a, a rotation of the coupling 126 is temporarily stopped.

An operation of the conventional draw out apparatus for an air circuit breaker will be explained.

FIGS. 4 to 6 are views illustrating an operation state of the draw out apparatus for an air circuit breaker in accordance with the conventional art, which illustrate a power transmission stopped state, a power transmission enabled state, and a power transmission restricted state by the coupling, respectively.

Referring to FIG. 4, the coupling 126 is positioned at a power transmission stopped state where the screw shaft 121 and the draw in and output shaft 122 are not connected to each other. The springs 127, 128 are in a discharged state of an elastic energy, and the reset operator 124 is on a downward-moved position.

In this state, even if the handle (H) is rotated by being connected to a handle connection part 122a of the draw out shaft 122, the draw out shaft 122 performs only idling without transmitting a rotational force to the screw shaft 121. The reason is because the draw out shaft 122 is not connected to the screw shaft 121, but is merely in a contacted state with the end of the screw shaft 121. Once the circuit breaker body reaches one of three positions (a disconnect position, a test position or a connect position), the draw out apparatus for an air circuit breaker automatically returns to the initial state.

In this case, as a user presses the reset pressing end part 124a of the reset operator 124, the upper spring 127 is compressed by a spring supporting part (not shown) of the reset operator 124 which upward moves linearly as shown in FIG. 5. As a result, the upper spring 127 stores an elastic energy therein, so the coupling 126 is pressurized to be moved upward. As an angular inner circumferential surface part 126b-1 of the coupling 126 is connected to a rectangular part 121b of the screw shaft 121 and a rectangular part 122c of the draw out shaft 122, the screw shaft 121 and the draw out shaft 122 are connected to each other. As a result, the circuit breaker body is ready to be drawn in the cradle or drawn out of the cradle.

Referring to FIG. 5, in a state where power transmission is enabled as the screw shaft 121 and the draw out shaft 122 are completely connected to each other, a user may connect the handle (H) to the handle connection part 122a of the draw out shaft 122, and rotates the handle (H) in a counterclockwise direction (a clockwise direction) in order to draw in (draw out) the circuit breaker body 101. As a result, the draw out shaft 122 is rotated in a counterclockwise direction (a clockwise direction), so the screw shaft 121 connected to the draw out shaft 122 by the coupling 126 is rotated in a counterclockwise direction (a clockwise direction). Accordingly, the moving rack 120 moves upward (downward) along a screw part 121a of the screw shaft 121 which rotates in a counterclockwise direction (a clockwise direction). As the moving rack 120 moves upward (downward), the circuit breaker body 101 moves in a draw in (draw out) direction.

Once the circuit breaker body 101 reaches one of a connect position, a test position and a disconnect position by being moved in a draw in direction or a draw out direction, the twisted part 123a of the indicating rod 123 is rotated as the moving rack 120 moves. As a result, the latch part 123b of the indicating rod 123 is separated from the latch groove 124c of the reset operator 124, so the reset operator 124 is released. Accordingly, as shown in FIG. 6, the lock plate is downward moved by the springs 127, 128 which are restored with discharging an elastic energy. As a result, the angular inner circumferential part 129a of the lock plate 129 is engaged with the angular outer circumferential part 126b of the coupling 126, thereby restricting the coupling 126. Accordingly, as the screw shaft 121 and the draw out shaft 122 are temporarily stopped, a user may be notified that the circuit breaker body has reached one of a connect position, a test position and a disconnect position.

Referring to FIG. 6, if the user stops the handle (H) being rotated, the coupling 126 is backward moved by an elastic force of the upper spring 127 which is extended. As a result, the draw out apparatus for an air circuit breaker returns to the initial state shown in FIG. 4. Here, the reset operator 124 returns up to a position where the fore end part 124b is locked by the supporting member 125. Further, as the coupling 126 is backward moved, a circular outer circumferential part 126a of the coupling 126 is positioned within the angular inner circumferential part 129a of the lock plate 129. The coupling 126 is in a released state where the coupling 126 is freely rotatable. Further, the angular inner circumferential surface part 126b-1 of the coupling 126 is engaged with only the rectangular part 122c of the draw out shaft 122, and the rectangular part 121b of the screw shaft 121 is released. As a result, even if the handle is connected to the draw out shaft 122 to thus be rotated, the draw out shaft 122 executes idling. This may protect the components of the draw out apparatus for an air circuit breaker, from damage due to an excessive over-rotation.

In the conventional draw out apparatus for an air circuit breaker, whenever the circuit breaker body reaches a connect position, a test position and a disconnect position, the reset operator is released and the coupling moves to a driving transmission stopped position by the spring. This may cause the draw out shaft and the screw shaft to be disconnected from each other. As a result, even if a user excessively rotates the handle, power transmission is not executed. This may prevent an over-driving of the components of the draw out apparatus for an air circuit breaker, and damage thereof.

However, in the conventional draw out apparatus for an air circuit breaker, a user may press the reset operator on a connect position or a disconnect position for a driving connection state shown in FIG. 5. Then, the user may operate the handle in a closing direction in an already connected (closed) state, or may operate the handle in an opening direction in an already disconnected (open) state. This may cause an over-driving of the components of the draw out apparatus for an air circuit breaker, resulting in damage of the components.

SUMMARY OF THE INVENTION

Therefore, an aspect of the detailed description is to provide a draw out apparatus for an air circuit breaker capable of allowing a circuit breaker body to be stopped at a preset position, by executing idling when an abnormal operation such as an over-draw in operation and an over-draw out operation occurs at the preset position such as a disconnect position, a test position or a connect position, and capable of preventing damage of a circuit breaker and a cradle.

To achieve these and other advantages and in accordance with the purpose of this specification, as embodied and broadly described herein, there is provided a draw out apparatus for an air circuit breaker, including: a cradle configured to accommodate therein a circuit breaker body; a driving shaft penetratingly-installed at first and second side plates of the cradle; and a worm wheel provided at one end of the driving shaft, characterized in that the apparatus includes: first and second plates installed at the first side plate so as to be spaced from each other, and a third plate installed in front of the first plate in a spaced manner; a main shaft rotatably installed at the first and second plates, and having a worm gear portion for rotating the worm wheel at part of an outer circumferential surface thereof; an inner clutch provided at a front end of the main shaft; a front shaft rotatably installed at the third plate, and coupled to the main shaft in a coaxial manner; and an outer clutch slidably installed at the front shaft, and formed to be coupled to or separated from the inner clutch.

A locking portion may be formed at the main shaft so as to protrude in a polygonal shape or a concavo-convex shape, and the apparatus may further include a coupling plate formed to be coupled to or separated from the locking portion. A coupling hole for inserting the locking portion may be formed at the coupling plate.

A flange may be formed at part of the front shaft so as to be supported by contacting the third plate. And a clutch spring may be provided between the outer clutch and the flange such that a force is applied in a direction to couple the outer clutch to the inner clutch.

A shaft groove for inserting part of the main shaft may be formed at a rear end of the front shaft in an axial direction.

A rear end of the front shaft may have a sectional surface of a polygonal shape, a cross shape or a saw-toothed shape, and an insertion groove having a polygonal shape, a cross shape or a saw-toothed shape may be formed at the outer clutch such that the rear end of the front shaft may be inserted into the outer clutch.

The inner clutch and the outer clutch may be provided with an inner bending portion and an outer bending portion, respectively, at contacting surfaces thereof, such that the inner clutch and the outer clutch may be coupled to each other or slide from each other.

The draw out apparatus for an air circuit breaker may further include a padlock fitted into an outer circumferential surface of the front shaft, having a box shape, and configured to move the coupling plate.

A return spring for returning the coupling plate to the original position may be provided between the coupling plate and the first plate.

A stopper may protrude from the first and second side plates, and a cam having first and second stopper grooves locked by the stopper at a connect position and a disconnect position, respectively, may be provided at one side of the driving shaft.

A latch for fixing the padlock which has been moved backward may be provided at the first side plate.

The draw out apparatus for an air circuit breaker according to an embodiment of the present invention may have the following advantages.

Firstly, when the circuit breaker body executes an abnormal operation such as an over-draw in operation and an over-draw out operation at a preset position such as a disconnect position, a test position or a connect position, the draw out apparatus for an air circuit breaker executes idling. This may prevent the circuit breaker body from being out of the preset position.

Secondly, the draw out apparatus for an air circuit breaker executes idling when an over-driving of the components of the apparatus occurs. This may prevent damage of the circuit breaker and the cradle.

Thirdly, with the structure where the main shaft and the front shaft are rotated by the clutch, a user may push the padlock backward at a disconnect position or a connect position to release a restricted state of the coupling plate to the locking portion and to transmit a driving force of the handle to the main shaft. However, in this case, a rotational force of the front shaft is not transmitted to the main shaft as the clutch slides. This may prevent an over-drawn in state and an over-drawn out state of the circuit breaker body, and may prevent damage of the components.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 11A and 11B are views illustrating a disconnect state of a draw out apparatus for an air circuit breaker according to an embodiment of the present invention, in which FIG. 11A is a perspective view and FIG. 11B is a side sectional view;

DETAILED DESCRIPTION OF THE INVENTION

Description will now be given in detail of preferred configurations of a draw out apparatus for an air circuit breaker according to the present invention, with reference to the accompanying drawings.

Figure 1:
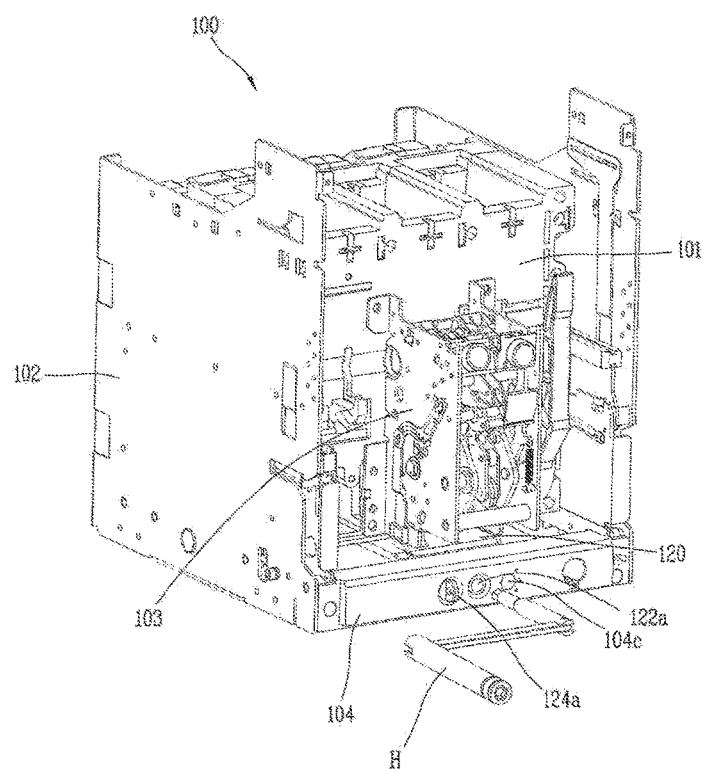
FIG. 1 is a view illustrating an inner structure of an air circuit breaker in accordance with the conventional art.
Figure 2:
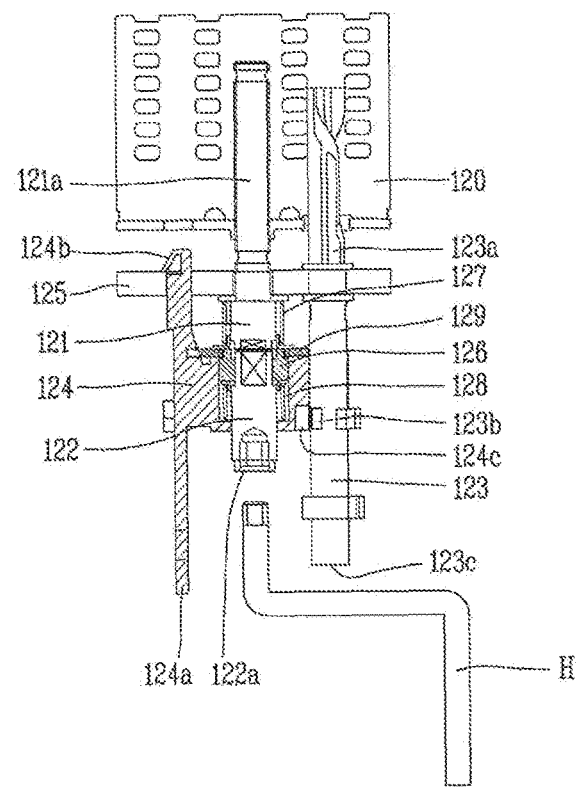
FIG. 2 is a planar view of a draw out apparatus for an air circuit breaker in accordance with the conventional art.
Figure 3:
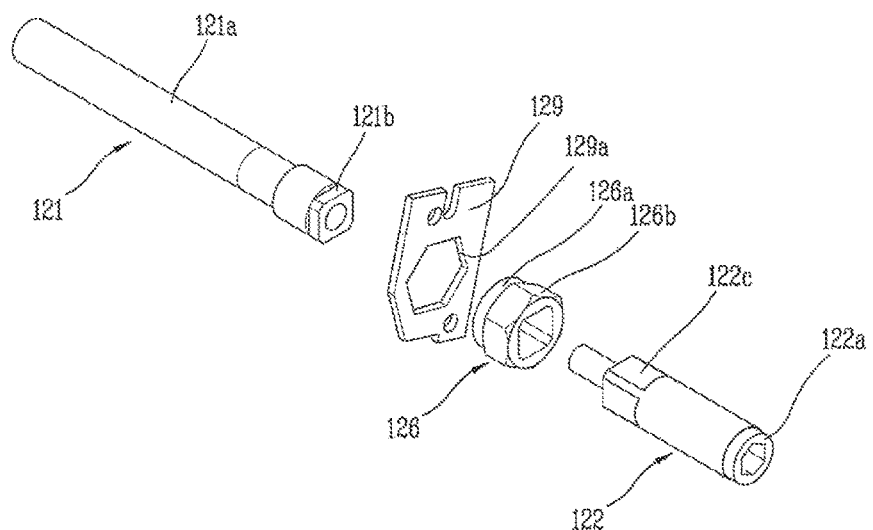
FIG. 3 is a perspective view of a screw shaft and a coupling applied to a draw out apparatus for an air circuit breaker in accordance with the conventional art.
Figure 4:
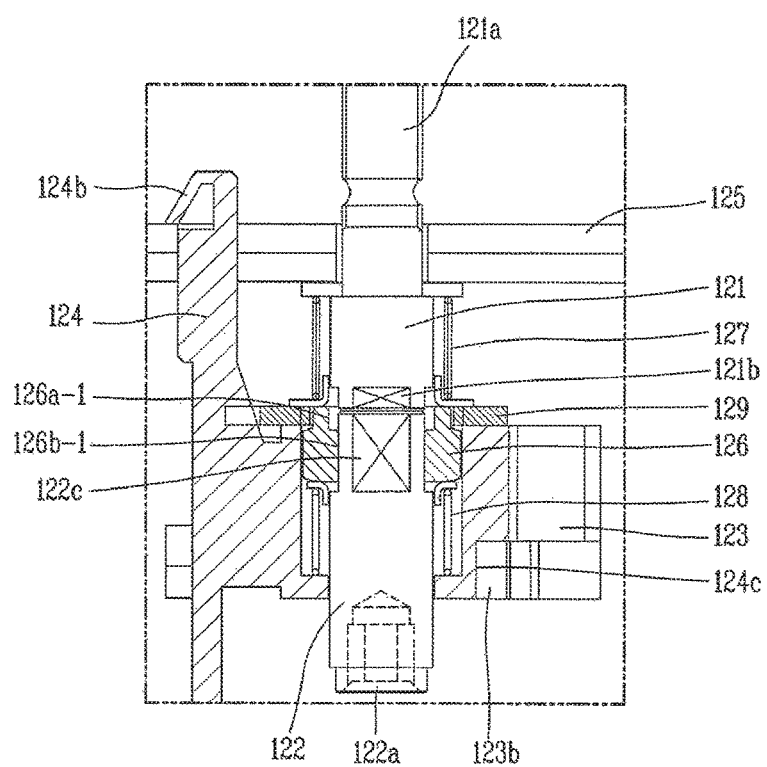
FIGS. 4 to 6 are views illustrating an operation state of a draw out apparatus for an air circuit breaker in accordance with the conventional art, which illustrate a power transmission stopped state, a power transmission enabled state, and a power transmission restricted state by a coupling, respectively.
Figure 5:
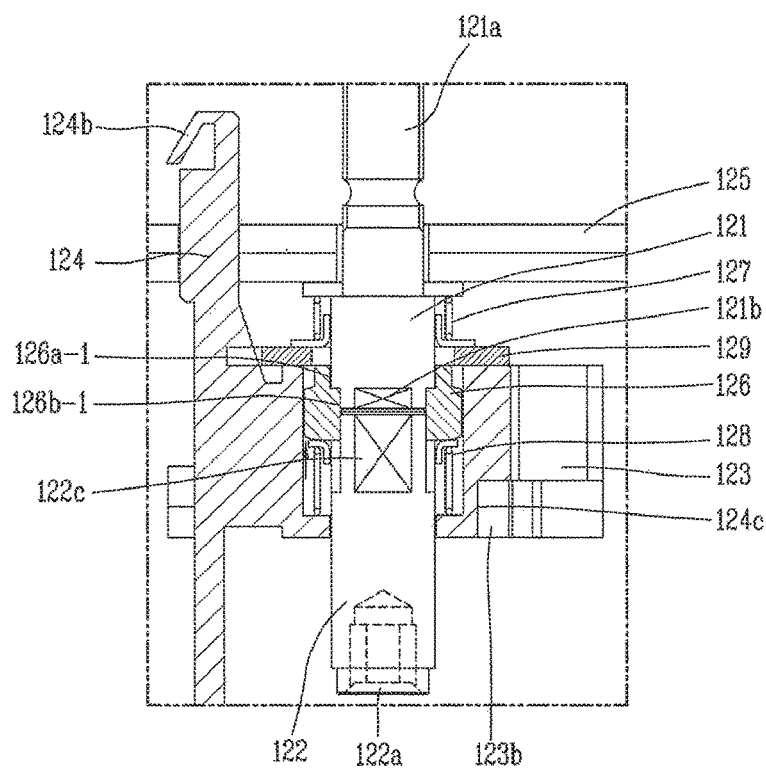
Figure 6:
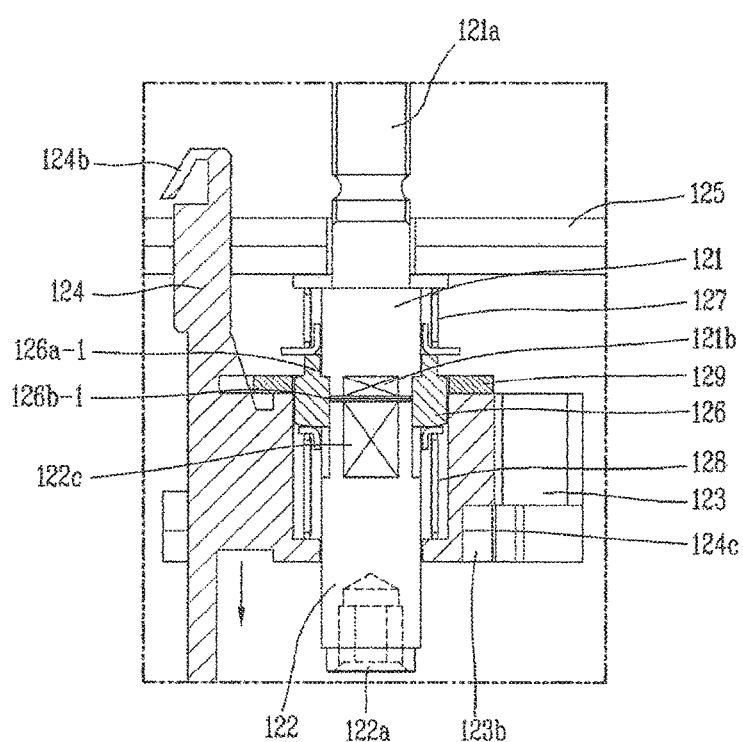
Figure 7:
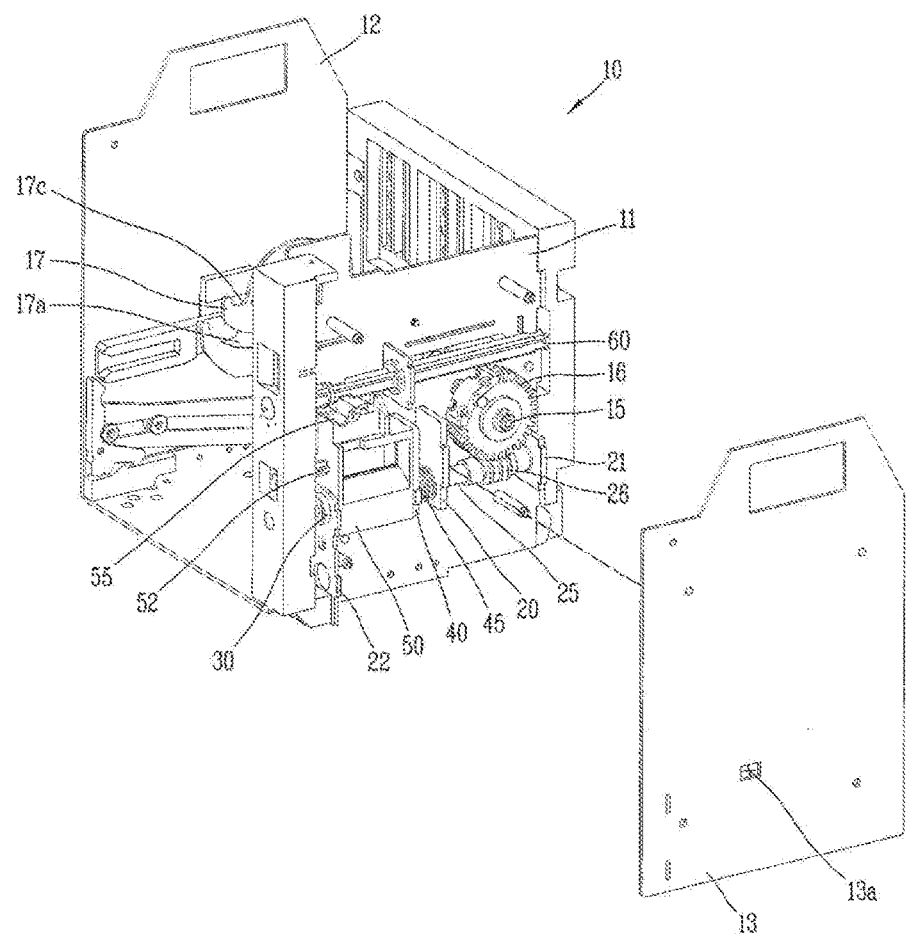
FIG. 7 is a perspective view of a cradle to which a draw out apparatus for an air circuit breaker according to an embodiment of the present invention is applied.
Figure 8A:
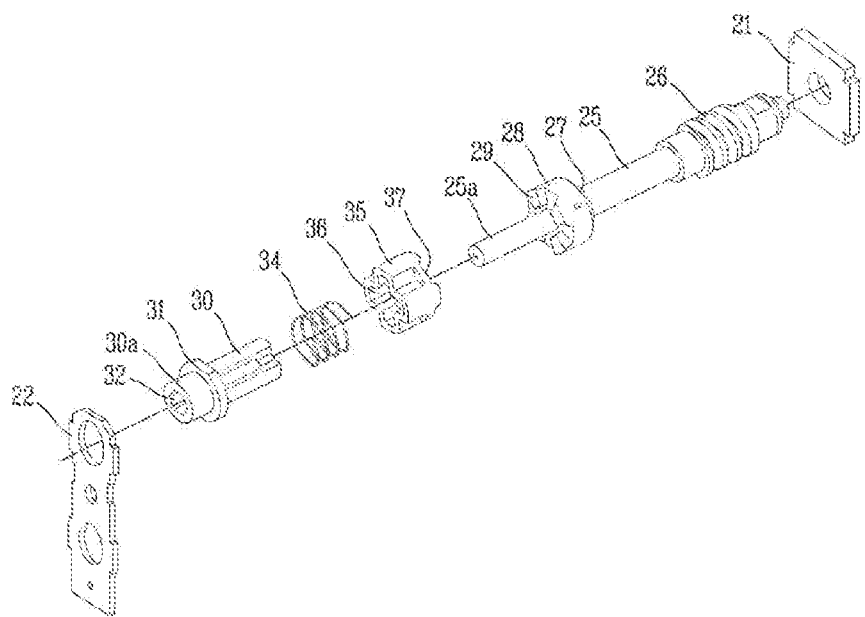
FIGS. 8A and 8B are disassembled perspective view of a draw out shaft applied to a draw out apparatus for an air circuit breaker according to an embodiment of the present invention.
Figure 8B:
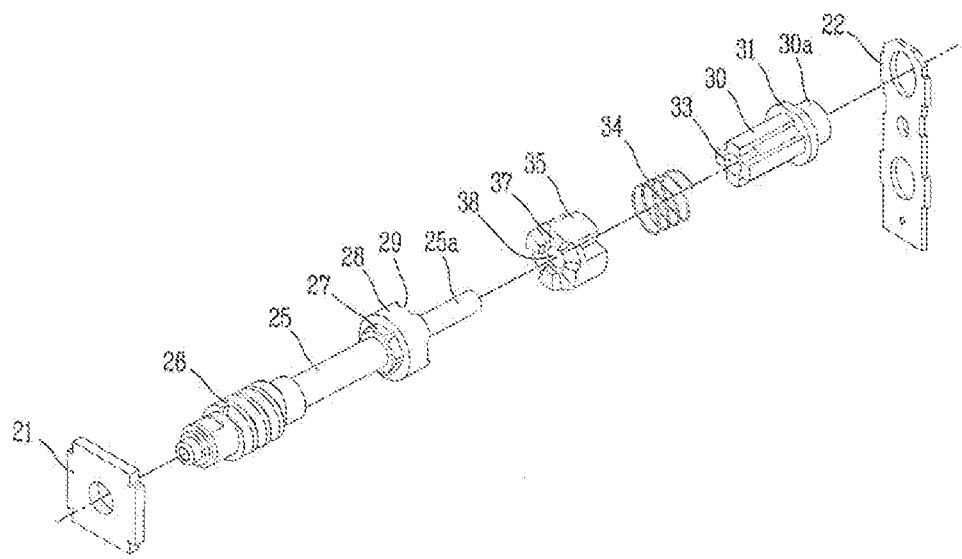
Figure 9:
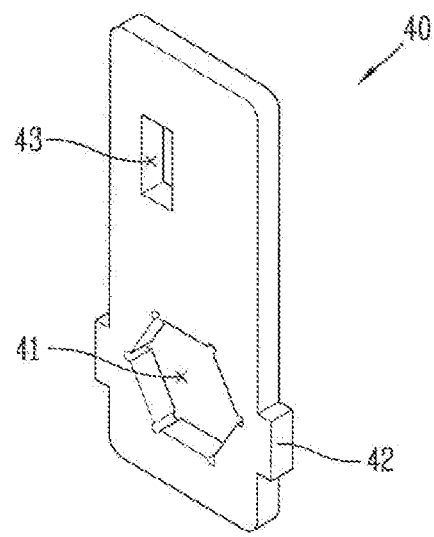
FIG. 9 is a perspective view of a coupling plate applied to a draw out apparatus for an air circuit breaker according to an embodiment of the present invention.
Figure 10:
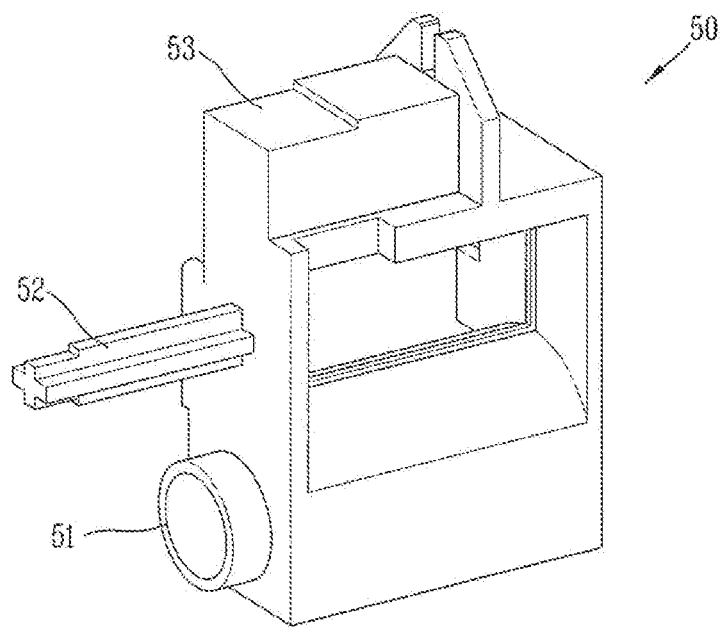
FIG. 10 is a perspective view of a padlock applied to a draw out apparatus for an air circuit breaker according to an embodiment of the present invention.

FIG. 7 is a perspective view of a cradle to which a draw out apparatus for an air circuit breaker according to an embodiment of the present invention is applied. FIGS. 8A and 8B are disassembled perspective view of a draw out shaft applied to a draw out apparatus for an air circuit breaker according to an embodiment of the present invention. FIG. 9 is a perspective view of a coupling plate applied to a draw out apparatus for an air circuit breaker according to an embodiment of the present invention. And FIG. 10 is a perspective view of a padlock applied to a draw out apparatus for an air circuit breaker according to an embodiment of the present invention.

Hereinafter, a draw out apparatus for an air circuit breaker according to each embodiment of the present invention will be explained in more detail with reference to the drawings.

A draw out apparatus for an air circuit breaker according to an embodiment of the present invention, which includes a cradle 10 configured to accommodate a circuit breaker body (not shown) therein, a driving shaft 15 penetratingly-installed at first and second side plates 11, 12 of the cradle 10, and a worm wheel 16 provided at one end of the driving shaft 15, includes: first and second plates 20, 21 installed at the first side plate 11 so as to be spaced from each other, and a third plate 22 installed in front of the first plate 20 in a spaced manner; a main shaft 25 rotatably installed at the first and second plates 20, 21, and having a worm gear portion 26 for rotating the worm wheel 16 at part of an outer circumferential surface thereof; an inner clutch 28 provided at a front end 25a of the main shaft 25; a front shaft 30 rotatably installed at the third plate 22, and coupled to the main shaft 25 in a coaxial manner; and an outer clutch 35 slidably installed at the front shaft 30, and formed to be coupled to or separated from the inner clutch 28.

The cradle 10 may be formed in a box shape having open front and upper surfaces. Both side surfaces of the cradle 100 are called the first side plate 11 and the second side plate 12.

The driving shaft 15 is provided at the cradle 10 in order to draw in and draw out a circuit breaker body (not shown). The driving shaft 15 may be formed to cross the first and second side plates 11, 12.

The worm wheel 16 is provided at one end of the driving shaft 15. The worm wheel 16 may be disposed outside the first side plate 11. As the worm wheel 16 is rotated, the driving shaft 15 coupled to the worm wheel 16 may be rotated.

A plurality of cams 17 may be installed at the driving shaft 15. A driving groove 17a may be formed at the cam 17 such that the circuit breaker body installed at the driving groove 17a may be drawn in or out when the cam 17 is rotated together with the driving shaft 15.

Draw out shafts 25, 30 are provided to rotate the worm wheel 16. The draw out shafts 25, 30 may include the main shaft 25 for rotating the worm wheel 16, and the front shaft 30 for selectively transmitting a driving force of a handle (not shown) to the main shaft 25. When the main shaft 25 is rotated together with the front shaft 30 in a coupled manner, the driving force of the handle may be transmitted to the worm wheel 16. Accordingly, the circuit breaker body may be drawn in or drawn out. On the other hand, when the main shaft 25 is separated from the front shaft 30, the driving force of the handle is not transmitted to the worm wheel 16. Accordingly, the circuit breaker body cannot be drawn in the cradle, nor drawn out of the cradle.

In order to support the main shaft 25, the first and second plates 20, 21 are provided. The first and second plates 20, 21 are installed to be perpendicular to the first side plate 11, in a spaced manner from each other. Each of the first and second plates 20, 21 is provided with a through hole, and the main shaft 25 is inserted into the through holes of the first and second plates 20, 21. An intermediate part of the main shaft 25 may be partially supported by the first plate 20, and a rear end of the main shaft 25 may be supported by the second plate 21.

A worm gear portion 26 is formed at part of the main shaft 25. The worm gear portion 26 may be formed between the intermediate part and the rear end of the main shaft 25, i.e., between the first and second plates 20, 21. Since the worm gear portion 26 is engaged with the worm wheel 16, the worm wheel 16 is rotated when the main shaft 25 rotates.

The inner clutch 26 is provided at a front end of the main shaft 25. When the inner clutch 28 is coupled to the outer clutch 35 of the front shaft 30, a rotational force of the front shaft 30 is transmitted to the main shaft 25. On the other hand, when the inner clutch 28 is separated from the outer clutch 35 of the front shaft 30, a rotational force of the front shaft 30 is not transmitted to the main shaft 25.

An inner bending portion 29 having a concavo-convex shape is formed on a surface of the inner clutch 28 to which the outer clutch 35 contacts. The inner bending portion 29 may have a trapezoid shape or a wavy shape when viewed from a side surface (refer to FIG. 14). Thus, the outer clutch 35 engaged with the inner clutch 28 may slide from the inner clutch 28 when a large force is applied to the outer clutch 35, thereby executing idling.

A locking portion 27, which protrudes in an angular shape or a concavo-convex shape, is formed at the main shaft 25. The locking portion 27 may be formed close to a rear end of the inner clutch 28. A coupling plate 40 to be explained later may be coupled to or separated from the locking portion 27.

The front shaft 30 is inserted into the front end 25a of the main shaft 25. The front shaft 30 receives a driving force of the handle, and transmits the received driving force to the main shaft 25 via the outer clutch 35 and the inner clutch 28. A shaft groove 33 for inserting part of the front end 25a of the main shaft 25 is formed at a rear end of the front shaft 30. An inner diameter of the shaft groove 33 may be formed to be equal to or larger than an outer diameter of the front end 25a of the main shaft 25. The front end 25a of the main shaft 25, and the shaft groove 33 of the front shaft 30 are formed to have a circular sectional surface, respectively, and are coupled to each other in a slidable manner. Thus, when the main shaft 25 and the front shaft 30 are coupled to each other, the front shaft 30 executes idling without transmitting a rotational force to the main shaft 25.

The front shaft 30 may be installed such that the front end 30a thereof may be inserted into a through hole of the third plate 22 installed at the first side plate 11, and such that the rear end thereof may be partially inserted into the front end 25a of the main shaft 25.

A flange 31 may be formed at part of the front end 30a of the front shaft 30, and the flange 31 may be installed to contact the third plate 22 so as to be supported.

A handle insertion opening 32, into which the handle is inserted in an axial direction such that a user manually generates a driving force, is provided at the front end 30a of the front shaft 30. The handle insertion opening 32 may be implemented in the form of a groove.

The front shaft 30 may be formed such that the rear end thereof or a rear side of the flange 31 has an edge section of a non-circular shape. For instance, the front shaft 30 may be formed such that a rear side of the flange 31 has an edge section of a polygonal shape, a cross shape or a saw-toothed shape. Accordingly, when the outer clutch 35 is inserted into the front shaft 30, the front shaft may receive a force in a rotation direction.

The outer clutch 35 is slidably fitted into the front shaft 30. An insertion groove 36 having a shape corresponding to the edge section of the front shaft 30 is formed at the outer clutch 35. That is, the insertion groove 36 having a polygonal shape, a cross shape or a saw-toothed shape may be formed at the outer clutch 35. Accordingly, the outer clutch 35 may be inserted into the rear end of the front shaft 30, thereby moving forward or backward in an axial direction.

A though hole 38, into which the front end 25a of the main shaft 25, is formed at the outer clutch 35.

An outer bending portion 37, which corresponds to the inner bending portion 29 of the inner clutch 28, is formed at a rear surface of the outer clutch 35, i.e., a contact region between the outer clutch 35 and the inner clutch 28. That is, the outer bending portion 37 may be formed to have a trapezoid shape, a wavy shape, etc.

The outer clutch 35 may be linearly moved in an axial direction in an inserted state into the front shaft 30. A clutch spring 34 is provided between the outer clutch 35 and the flange 31. The clutch spring 34 provides a force to push the outer clutch 35 toward the inner clutch 28. Accordingly, when no external force is applied, the outer clutch 35 is in a coupled state to the inner clutch 28. That is, when no external force is applied, a driving force of the handle is transmitted to the main shaft 25 via the front shaft 30, the outer clutch 35 and the inner clutch 28. As a result, the main shaft 25 may be integrally rotated with the front shaft 30.

In the case of the main shaft 25 being in a fixed state by an external force, if the front shaft 30 is rotated by a driving force of the handle, and the outer clutch 35 is also rotated, the outer clutch 35 slides from the inner clutch 28, since the outer bending portion 37 of the outer clutch 35 and the inner bending portion 29 of the inner clutch 28 have inclined regions of a trapezoid shape or a wavy shape as aforementioned. In this case, the outer clutch 35 is rotated and is moved forward or backward repeatedly along the front shaft 30. That is, the outer clutch 35 slides along inclined regions of a contact surface with the inner clutch 28, and moves backward when a protrusion of the outer clutch 35 and a protrusion of the inner clutch 28 meet each other, thereby pressing the clutch spring 34. When the protrusion of the outer clutch 35 and a concavo-convex part of the inner clutch 28 meet each other, the outer clutch 35 moves forward by a restoration force of the clutch spring 34.

The coupling plate 40 is provided between the inner clutch 28 and the first plate 20 of the main shaft 25. A coupling hole 41 may be formed at the coupling plate 40, thereby being moved in a lengthwise direction of the main shaft 25. The coupling hole 41 may be formed to have the same shape as an outer surface of the locking portion 27. That is, the coupling hole 41 may be formed in a polygonal shape or a concavo-convex shape.

Sliding protrusions 42, installed between the first side plate 11 and the cover plate 13 so as to be supported, are formed at two side surfaces of the coupling plate 40. Since the sliding protrusions 42 are slidably fitted into a sliding hole (not shown) of the first side plate 11 and a sliding hole 13a of the cover plate 13, the coupling plate 40 may move forward or backward in a lengthwise direction of the main shaft 25. Since the coupling plate 40 is installed to contact the first side plate 11 and the cover plate 13, it is not moved in a rotation direction of the main shaft 25.

An insertion hole 43 for inserting part of a padlock 50 to be explained later, may be formed at part of the coupling plate 40.

A return spring 45 is provided between the coupling plate 40 and the first plate 20. Since the first plate 20 is in a fixed state, the return spring 45 pushes the coupling plate 40 toward the inner clutch 28. Thus, when no external force is applied, the locking portion 27 is fitted into the coupling hole 41, and the coupling plate 40 is in a contacted state with the inner clutch 28. When the coupling plate 40 is coupled to the locking portion 27, the main shaft 25 cannot be rotated because it is restricted by the coupling plate 40.

If the coupling plate 40 is separated from the locking portion 27 while compressing the return spring 45 by an external force, the main shaft 25 may freely rotate since its restricted state by the coupling plate 40 is released.

A padlock 50 is provided at the front shaft 30. The padlock 50 may be formed in a box shape. A shaft insertion hole 51 for inserting the front shaft 30 is penetratingly-formed at the padlock 50 in a lengthwise direction. A pressing protrusion 52 pressed by a user is formed to protrude from a front surface of the padlock 50. When no external force is applied, i.e., when a user does not press the pressing protrusion 52, a rear surface of the padlock 50 comes in contact with the coupling plate 40. In this case, the coupling plate 40 is in a coupled state to the locking portion 27. If a user presses the pressing protrusion 52, the padlock 50 moves backward to push the coupling plate 40. As a result, the coupling plate 40 may be separated from the locking portion 27.

In the state where the padlock 50 has moved backward (i.e., in the state where the coupling plate 40 has been separated from the locking portion 27), the padlock 50 is fixed by a latch 55. The latch 55 is rotatably installed at part of the first side plate 11, and receives a force in a clockwise direction by a spring (not shown). A latch jaw 53 is formed at an upper part of the padlock 50. In the state where the padlock 50 has moved backward, the latch 55 is rotated in a clockwise direction to thus be fitted into the latch jaw 53, and the padlock 50 is in a fixed state. If the latch 55 is rotated in a counterclockwise direction by an external force to be separated from the latch jaw 53, the padlock 50 is moved forward by a restoration force of the return spring 45, together with the coupling plate 40. The latch 55 may be controlled to move on a preset position (e.g., a disconnect position, a test position, or a connect position) by an indicator 60. A protrusion 61 is formed at the indicator 60, thereby providing a force in a counterclockwise direction by pressing a left end of the latch 55 on a preset position (e.g., a disconnect position, a test position, or a connect position).

A cam 17 is provided to transmit a force to the circuit breaker body (not shown) for a draw in operation or a draw out operation. The cam 17 is provided in a pair, and the two cams 17 are installed at the driving shaft 15 so as to be adjacent to the inside of the first and second side plates 11, 12, respectively. And the cams 17 are rotated together with the driving shaft 15. A driving groove 17*a* is formed at the cam 17, and the cams 17 draw in or draw out the circuit breaker body to or from the cradle.

A stopper 18 is provided to restrict a movement of the cam 17. The stopper 18 protrudes from the first and second side plates 11, 12. The cam 17 is provided with first and second stopper grooves 17*b*, 17*c*, so as to be fixed at a connect position or a disconnect position by being locked by the stopper 18. At a disconnect position of the air circuit breaker, a counterclockwise rotation of the cam 17 and the driving shaft 15 is prevented since the stopper 18 is locked by the first stopper groove 17*b* of the cam 17. As a result, the worm wheel 16 and the main shaft 25 are prevented from moving. This may prevent an over-drawn out state of the circuit breaker body. At a connect position of the air circuit breaker, a clockwise rotation of the cam 17 and the driving shaft 15 is prevented since the stopper 18 is locked by the second stopper groove 17*c* of the cam 17. As a result, the worm wheel 16 and the main shaft 25 are prevented from moving. This may prevent an over-drawn in state of the circuit breaker body.

Hereinafter, an operation of the draw out apparatus for an air circuit breaker according to an embodiment of the present invention will be explained.

Figure 11A:
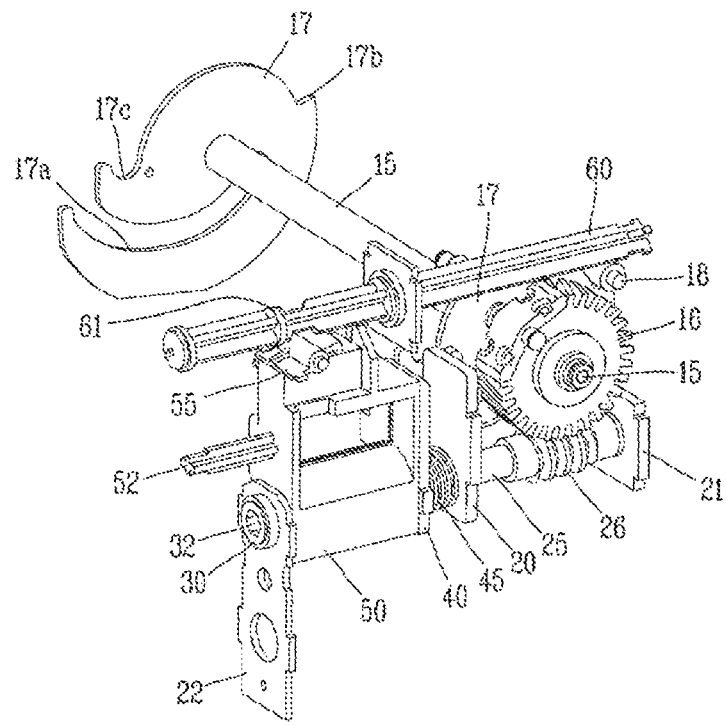
Figure 11B:
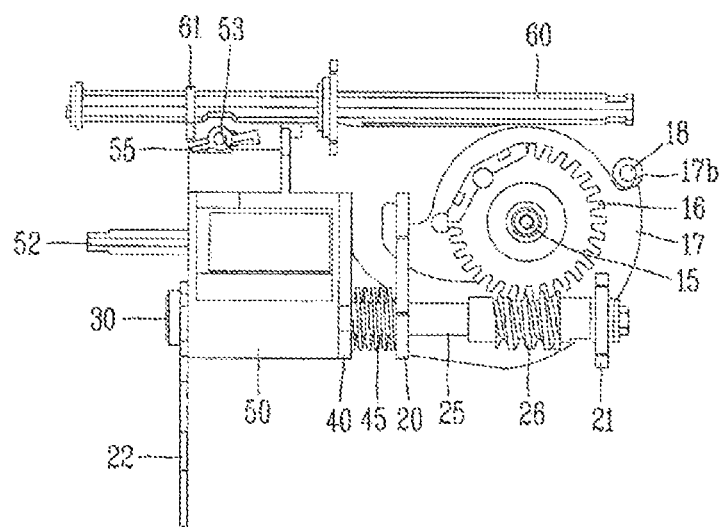

FIGS. 11A and 11B are views illustrating a disconnect state of the draw out apparatus for an air circuit breaker according to an embodiment of the present invention, in which FIG. 11A is a perspective view and FIG. 11B is a side sectional view.

In the disconnect state of the draw out apparatus for an air circuit breaker shown in FIG. 11A or 11B, if the handle is driven in an over-draw out direction, the main shaft is prevented from rotating since the locking portion 27 is coupled to the coupling plate 40. As a result, a driving force of the front shaft 30 is used to rotate the outer clutch 35. However, since the outer clutch 35 slides from the inner clutch 28, a rotational force of the outer clutch 35 is not transmitted to the main shaft 25. That is, the front shaft 30 and the outer clutch 35 execute idling. This may prevent an over-drawn out state of the circuit breaker body. Since a rotation of the cam 17 in an over-draw out direction is prevented as the cam 17 is restricted to the stopper 18, an over-drawn out state of the circuit breaker body is prevented.

Figure 12:
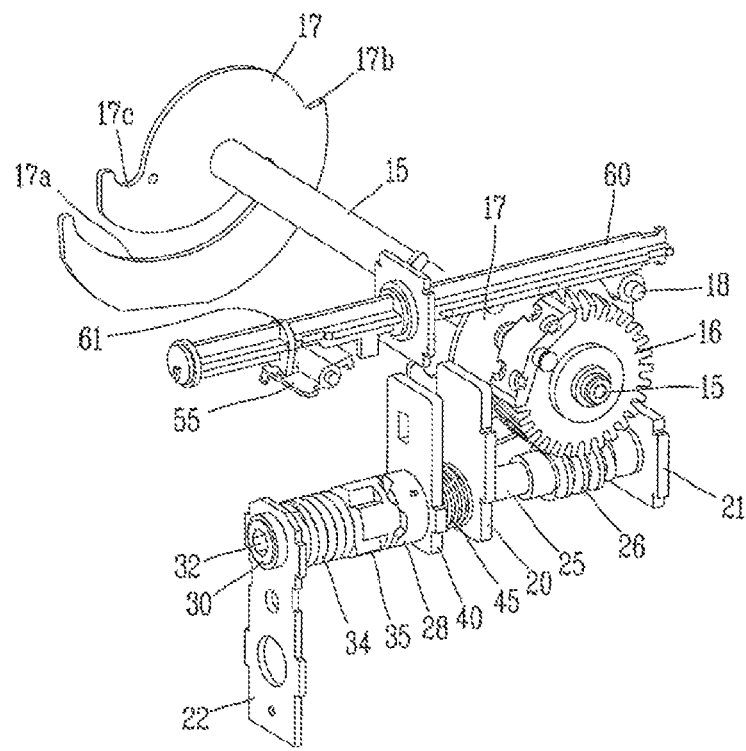
FIG. 12 is a perspective view illustrating that a front shaft and an outer clutch perform idling when a driving force is applied in an over-draw out direction, at a disconnect position of a draw out apparatus for an air circuit breaker according to an embodiment of the present invention.

FIG. 12 is a perspective view illustrating that the front shaft 30 and the outer clutch 35 perform idling when a driving force is applied in an over-draw out direction, at a disconnect position of a draw out apparatus for an air circuit breaker according to an embodiment of the present invention.

The outer clutch 35, engaged with the inner clutch 28, performs idling with sliding from the inner clutch 28, without transmitting a rotational force.

FIG. 12 illustrates a removed state of the padlock 50 for convenience.

Figure 13:
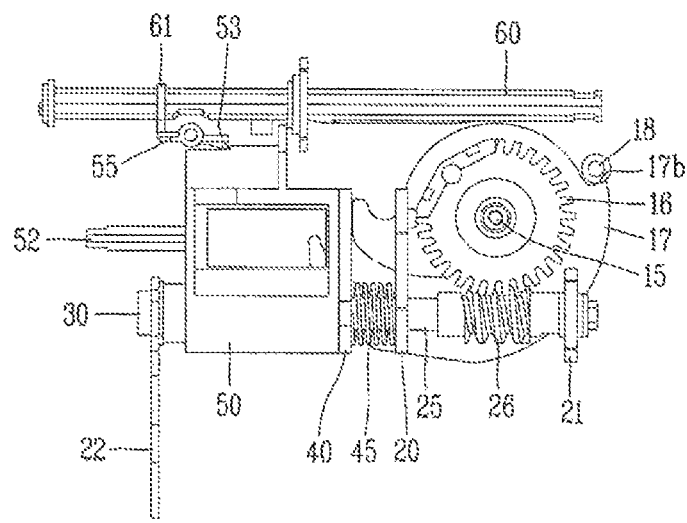
FIG. 13 is a side sectional view illustrating that a padlock and a coupling plate have moved backward, at a disconnect position of a draw out apparatus for an air circuit breaker according to an embodiment of the present invention.
Figure 14:
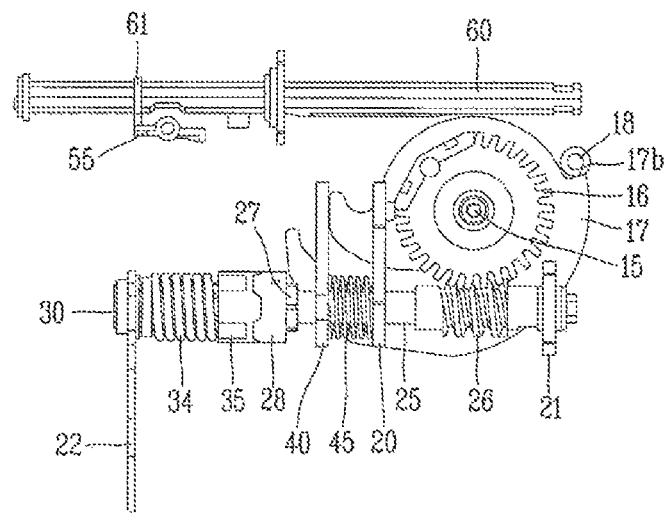
FIG. 14 is a side sectional view illustrating a removed state of the padlock of FIG. 13.

Referring to FIGS. 13 and 14, when a user pushes the padlock 50 backward (to the right in the drawings) by pressing the pressing protrusion 52 of the padlock 50 at a disconnected state (refer to FIGS. 11A and 11B), in order to draw in the circuit breaker body, the coupling plate 40 contacting the padlock 50 is also moved backward. Once the padlock 50 is moved backward, the latch 55 is rotated in a clockwise direction to be locked by the latch jaw 53. As a result, the padlock 50 is in a fixed state. The state where the padlock 50 and the coupling plate 40 have been moved backward is illustrated in FIGS. 13 and 14. FIG. 14 is a side sectional view illustrating a removed state of the padlock of FIG. 13. Since the coupling plate 40 is separated from the locking portion 27, rotation of the main shaft 25 is allowed, and a driving force of the front shaft 30 is transmittable to the main shaft 25.

Thus, once a user rotates the front shaft 30 by inserting the handle into the handle insertion opening 32, the circuit breaker body may be drawn in the cradle. In this case, if the user rotates the handle in a draw in direction of the circuit breaker body, a driving force of the handle is transmitted to the worm wheel 16 via the front shaft 30 and the main shaft 25. As a result, the driving shaft 15 is rotated to draw in the circuit breaker body to the cradle.

Figure 15:
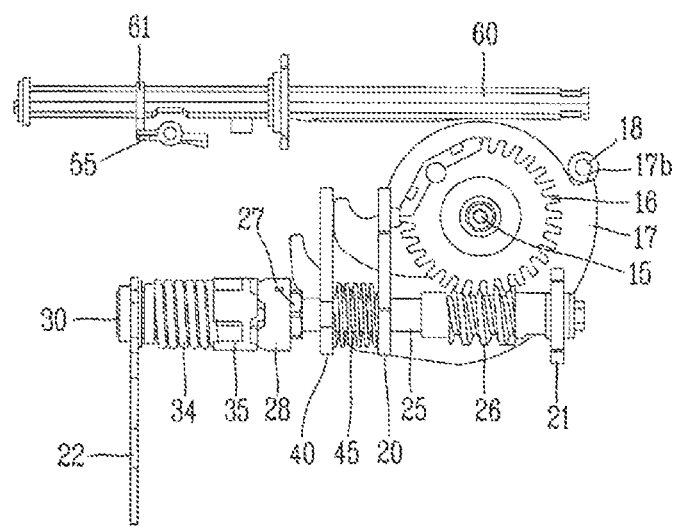
FIG. 15 is a side sectional view illustrating that a front shaft and an outer clutch perform idling when a driving force is applied in a draw out direction in a state where a padlock and a coupling plate have moved backward, at a disconnect position of a draw out apparatus for an air circuit breaker according to an embodiment of the present invention.

On the other hand, if the user rotates the handle in a draw out direction of the circuit breaker body, the driving force of the handle is about to rotate the front shaft 30 and the main shaft 25. However, rotation of the worm wheel 16 is prevented because the stopper 18 is locked by the first stopper groove 17*b* of the cam 17. As a result, rotation of the main shaft 25 to which the worm gear portion 26 is engaged is not allowed. Even if the user rotates the handle for an over-drawn out state of the circuit breaker body, the outer clutch 35 slides from the inner clutch 28 as shown in FIG. 15. As a result, the front shaft 30 performs idling, and a rotational force of the front shaft 30 is not transmitted to the main shaft 25.

Figure 16:
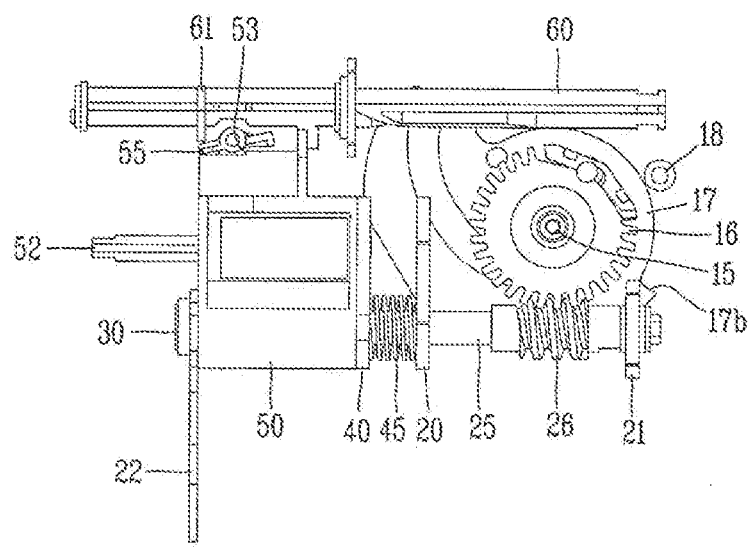
FIG. 16 is a side sectional view of a draw out apparatus for an air circuit breaker according to an embodiment of the present invention, at a test position.
Figure 17:
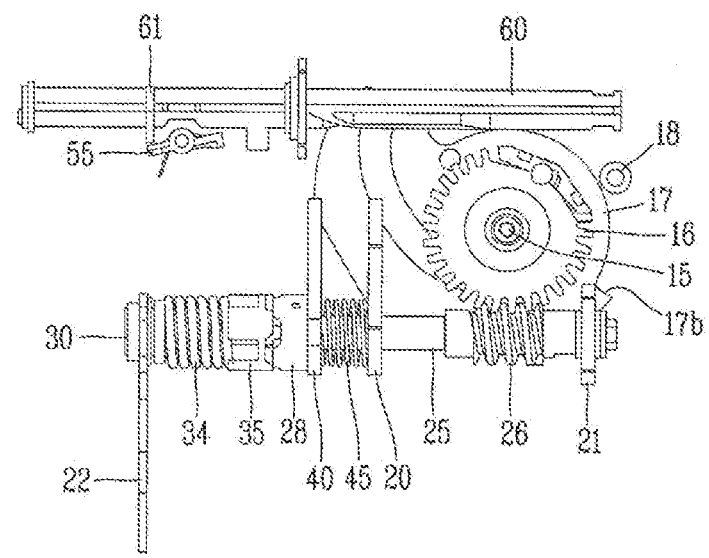
FIG. 17 is a side sectional view illustrating that a front shaft and an outer clutch perform idling when an over-driving force is applied, at a test position of a draw out apparatus for an air circuit breaker according to an embodiment of the present invention.

Referring to FIG. 16, in a state where a rotational force of the front shaft 30 is transmittable to the main shaft 25 as the padlock 50 has been moved backward as shown in FIG. 13, if the handle is rotated in a draw in direction of the circuit breaker body, a driving force of the handle is transmitted to the worm wheel 16 via the front shaft 30 and the main shaft 25. As a result, the driving shaft 15 and the cams 17 are rotated to move the circuit breaker body to a test position. In this case, as the indicator 60 is rotated, the protrusion 61 presses the left end of the latch 55. As a result, the latch 55 is separated from the latch jaw 53 of the padlock 50, and the padlock 50 and the coupling plate 40 return to the original position (the left side in the drawing) by a restoration force of the return spring 45. FIG. 16 illustrates that the circuit breaker body is at a test position. Referring to FIG. 16, the worm wheel 16 and the cam 17 have been rotated by a predetermined angle in a clockwise direction, and the padlock 50 and the coupling plate 40 have returned to the original position. Even if the handle is rotated in this state, a driving force of the front shaft 30 is not transmitted to the main shaft 25 as the outer clutch 35 slides from the inner clutch 28, since the locking portion 27 is in a coupled state to the coupling plate 40. FIG. 17 illustrates idling of the front shaft 30 and the outer clutch 35 even if an over-driving of the components of the apparatus is executed at a test position.

Figure 18:
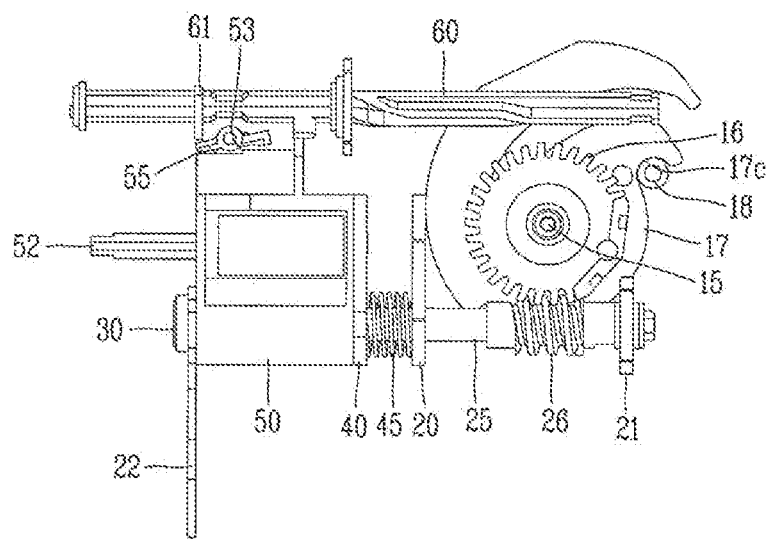
FIG. 18 is a side sectional view of a draw out apparatus for an air circuit breaker according to an embodiment of the present invention, at a connect position.
Figure 19:
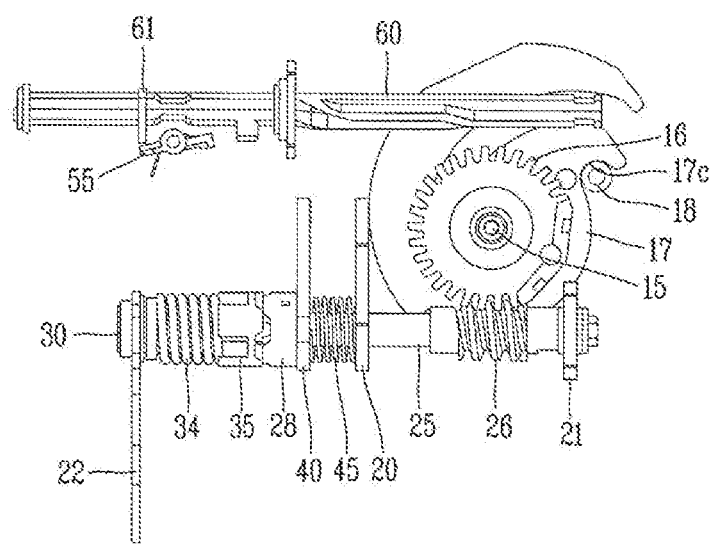
FIG. 19 is a side sectional view illustrating that a front shaft and an outer clutch perform idling when a driving force is applied in a draw in direction, at a connect position of a draw out apparatus for an air circuit breaker according to an embodiment of the present invention.

If a user moves the padlock 50 and the coupling plate 40 backward to fix them by pressing the pressing protrusion 52 in the state of FIG. 16, a driving force of the handle may be transmitted to the main shaft 25 from the front shaft 30. If the handle is rotated in a draw in direction of the circuit breaker body, the driving force of the handle is transmitted to the worm wheel 16 via the front shaft 30 and the main shaft 25. As a result, the driving shaft 15 and the cams 17 are rotated to move the circuit breaker body to a connect position. In this case, as the indicator 60 is rotated, the protrusion 61 presses the left end of the latch 55. As a result, the latch 55 is separated from the latch jaw 53 of the padlock 50, and the padlock 50 and the coupling plate 40 return to the original position (the left side in the drawing) by a restoration force of the return spring 45. FIG. 18 illustrates a state where the circuit breaker body is on a connect position. Referring to FIG. 18, as the worm wheel 16 and the cam 17 are more rotated in a clockwise direction, the stopper 18 have contacted the second stopper groove 17c of the cam 17, and the padlock 50 and the coupling plate 40 have returned to the original position. Even if the handle is rotated in this state, a driving force of the front shaft 30 is not transmitted to the main shaft 25 as the outer clutch 35 slides from the inner clutch 28, since the locking portion 27 is in a coupled state to the coupling plate 40. Further, as the cam 17 cannot be rotated in a locked state by the stopper 18, an over-draw in state of the circuit breaker body is prevented. FIG. 19 illustrates idling of the front shaft 30 and the outer clutch 35 even if an over-driving of the components of the apparatus is executed at a connect position.

Figure 20:
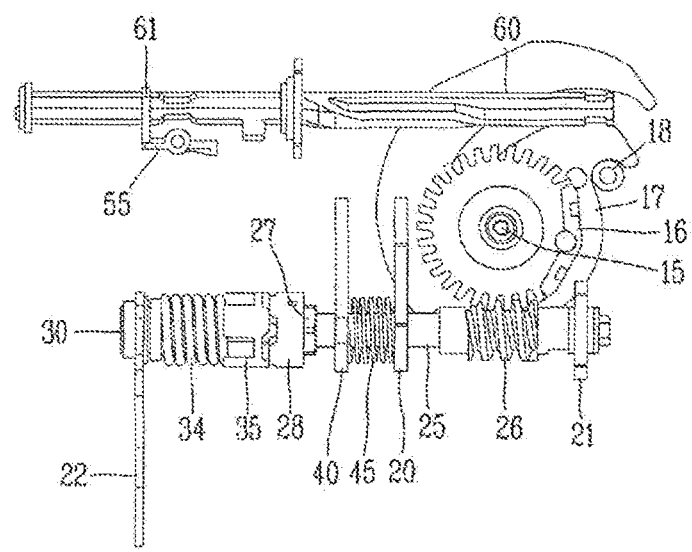
FIG. 20 is a side sectional view illustrating that a front shaft and an outer clutch perform idling when a driving force is applied in a draw in direction in a state where a padlock and a coupling plate have moved backward, at a connect position of a draw out apparatus for an air circuit breaker according to an embodiment of the present invention.

A user may move the padlock 50 and the coupling plate 40 backward by pressing the pressing protrusion 52 in the connect state of FIG. 19, thereby allowing the main shaft 25 to be rotated. However, if the user rotates the handle in an over-draw in direction, the cam 17 is prevented from rotating since the second stopper groove 17c is in a locked state by the stopper 18. This may prevent an over-drawn in state of the circuit breaker body, and may allow the inner clutch 28 to execute idling without transmitting a rotational force to the outer clutch 35. FIG. 20 illustrates such idling.

The draw out apparatus for an air circuit breaker according to an embodiment of the present invention may have the following advantages.

Firstly, when the circuit breaker body executes an abnormal operation such as an over-draw in operation and an over-draw out operation at a preset position such as a disconnect position, a test position or a connect position, the draw out apparatus for an air circuit breaker executes idling. This may prevent the circuit breaker body from being out of the preset position.

Secondly, the draw out apparatus for an air circuit breaker executes idling when an over-driving of the components of the apparatus occurs. This may prevent damage of the circuit breaker and the cradle.

Thirdly, with the structure where the main shaft and the front shaft are rotatable by the clutch, a user may push the padlock backward at a disconnect position or a connect position to release a restricted state of the coupling plate to the locking portion and to transmit a driving force of the handle to the main shaft. However, in this case, a rotational force of the front shaft is not transmitted to the main shaft as the clutch slides. This may prevent an over-drawn in state and an over-drawn out state of the circuit breaker body, and may prevent damage of the components.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A draw out apparatus for an air circuit breaker, comprising:
    a cradle configured to accommodate therein a circuit breaker body;
    a driving shaft penetratingly-installed at first and second side plates of the cradle; and
    a worm wheel provided at one end of the driving shaft, characterized in that the apparatus comprises:
    first and second plates installed at the first side plate so as to be spaced from each other, and a third plate installed in front of the first plate in a spaced manner;
    a main shaft rotatably installed at the first and second plates, and having a worm gear portion for rotating the worm wheel at part of an outer circumferential surface thereof;
    an inner clutch provided at a front end of the main shaft;
    a front shaft rotatably installed at the third plate, and coupled to the main shaft in a coaxial manner; and
    an outer clutch slidably installed at the front shaft, and formed to be coupled to or separated from the inner clutch.

2. The apparatus of claim 1, wherein a locking portion is formed at the main shaft so as to protrude in a polygonal shape or a concavo-convex shape,
    wherein the apparatus further comprises a coupling plate formed to be coupled to or separated from the locking portion, and
    wherein a coupling hole for inserting the locking portion is formed at the coupling plate.

3. The apparatus of claim 1, wherein a flange is formed at part of the front shaft so as to be supported by contacting the third plate, and
    wherein a clutch spring is provided between the outer clutch and the flange such that a force is applied in a direction to couple the outer clutch to the inner clutch.

4. The apparatus of claim 1, wherein a shaft groove for inserting part of the main shaft is formed at a rear end of the front shaft in an axial direction.

5. The apparatus of claim 1, wherein a rear end of the front shaft has a sectional surface of a polygonal shape, a cross shape or a saw-toothed shape, and wherein an insertion groove having a polygonal shape, a cross shape or a saw-toothed shape is formed at the outer clutch such that the rear end is inserted into the outer clutch.

6. The apparatus of claim 1, wherein the inner clutch and the outer clutch are provided with an inner bending portion and an outer bending portion, respectively, at contacting surfaces thereof, such that the inner clutch and the outer clutch are coupled to each other or slide from each other.

7. The apparatus of claim 2, further comprising a padlock fitted into an outer circumferential surface of the front shaft, having a box shape, and configured to move the coupling plate.

8. The apparatus of claim 2, wherein a return spring for returning the coupling plate to the original position is provided between the coupling plate and the first plate.

9. The apparatus of claim 1, wherein a stopper protrudes from the first and second side plates, and
wherein a cam having first and second stopper grooves locked by the stopper at a connect position and a disconnect position, respectively, is provided at one side of the driving shaft.

10. The apparatus of claim 7, wherein a latch for fixing the padlock which has been moved backward is provided at the first side plate.

* * * * *